United States Patent
Blinick et al.

(10) Patent No.: US 7,546,415 B2
(45) Date of Patent: Jun. 9, 2009

(54) APPARATUS, SYSTEM, AND METHOD FOR INTEGRATING MULTIPLE RAID STORAGE INSTANCES WITHIN A BLADE CENTER

(75) Inventors: Katherine Tyldesley Blinick, Tucson, AZ (US); Shah Mohammad Rezaul Islam, Tucson, AZ (US); Gregg Steven Lucas, Tucson, AZ (US); Robert Earl Medlin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 11/464,701

(22) Filed: Aug. 15, 2006

(65) Prior Publication Data

US 2008/0046647 A1    Feb. 21, 2008

(51) Int. Cl.
*G06F 12/00*  (2006.01)
(52) U.S. Cl. .................. 711/114; 711/152; 711/163; 711/170
(58) Field of Classification Search ............ None
See application file for complete search history.

(56) References Cited

U.S. PATENT DOCUMENTS

| | | | |
|---|---|---|---|
| 6,065,096 A | 5/2000 | Day et al. | 711/114 |
| 6,381,674 B2 | 4/2002 | DeKoning et al. | 711/113 |
| 6,745,258 B1 | 6/2004 | Pellegrino et al. | 710/33 |
| 6,763,398 B2 | 7/2004 | Brant et al. | 710/8 |
| 7,356,638 B2 * | 4/2008 | Holland et al. | 710/316 |
| 2001/0002480 A1 | 5/2001 | DeKoning et al. | 711/130 |
| 2004/0028068 A1 | 2/2004 | Kizhepat | 370/420 |
| 2005/0010838 A1 * | 1/2005 | Davies et al. | 714/100 |
| 2005/0021606 A1 | 1/2005 | Davies et al. | 709/203 |
| 2005/0050273 A1 | 3/2005 | Horn et al. | 711/114 |
| 2005/0157754 A1 | 7/2005 | Pettey | 370/469 |
| 2006/0248379 A1 * | 11/2006 | Jernigan | 714/6 |
| 2007/0226415 A1 * | 9/2007 | Holland et al. | 711/114 |
| 2007/0276997 A1 * | 11/2007 | Luning et al. | 711/114 |
| 2008/0034067 A1 * | 2/2008 | Islam et al. | 709/220 |
| 2008/0091810 A1 * | 4/2008 | Blinick et al. | 709/223 |
| 2008/0126582 A1 * | 5/2008 | Holland et al. | 710/6 |
| 2008/0126696 A1 * | 5/2008 | Holland et al. | 711/114 |
| 2008/0126715 A1 * | 5/2008 | Fujie et al. | 711/154 |
| 2008/0147844 A1 * | 6/2008 | Islam et al. | 709/224 |

FOREIGN PATENT DOCUMENTS

WO    WO 2005/057318    6/2005

* cited by examiner

*Primary Examiner*—Jack A Lane
(74) *Attorney, Agent, or Firm*—Kunzler & McKenzie

(57) ABSTRACT

An apparatus, system, and method are disclosed for integrating redundant array of independent disk ("RAID") storage within a blade center. A plurality of mutually autonomous storage subsystems mount within the blade center through a switch. Each storage subsystem includes a storage module comprising a plurality of storage devices and a RAID controller. A server blade mounted within the blade center may access a first storage subsystem through a switch module. The switch module is a non-blocking, cross-point switch. In one embodiment, the switch module restricts the server blade's access to a second storage subsystem.

22 Claims, 10 Drawing Sheets

APPARATUS, SYSTEM, AND METHOD FOR INTEGRATING MULTIPLE RAID STORAGE INSTANCES WITHIN A BLADE CENTER

BACKGROUND OF THE INVENTION

1. Field of the Invention

This invention relates to integrating storage and more particularly relates to integrating redundant array of independent disk ("RAID") storage in a blade center.

2. Description of the Related Art

Data processing centers are increasingly employing blade centers to deploy multiple servers. A blade center typically includes an enclosure with a communications back plane. A plurality of server blades are mounted within the enclosure. In addition, each server blade is in communication with the communications back plane. Each server blade includes one or more processors, memory, communications logic, and the like that enable the server blade to function as a server as is well known to those skilled in the art.

Integrating the server functions into a server blade may reduce the cost and administrative overhead of running a data processing center. Server blades can easily be replaced. For example, a first server blade may be replaced by removing the first server blade from an enclosure and by mounting a second server blade in the enclosure. In addition, adding server blades to an enclosure can quickly add processing capacity to a data processing center.

Like stand-alone servers, server blades often require access to one or more storage subsystems. A server blade may store and retrieve large amounts of data on the storage subsystems. In addition, the server blade may share data with other server blades through the storage subsystems. For example, a storage subsystem may include a database. A plurality of server blades may access the database, reading data from the database and writing data to the database. The database may employ data locks on accessed data within the database to maintain coherent data.

Unfortunately, storage subsystems are not as easily managed as server blades, For example, a storage subsystem may require communications channels from the blade center to a storage area network ("SAN") or the like, communications channels between the SAN and the storage controllers, and additional communications channels between the storage controllers and the storage devices. Configuring and maintaining the communications channels requires additional administrative overhead, increasing the time required to add storage elements and make replacements. The administrative overhead is particularly significant for RAID systems, which include a plurality of storage devices.

From the foregoing discussion, it should be apparent that a need exists for an apparatus, system, and method that integrate RAID storage in a blade center. Beneficially, such an apparatus, system, and method would reduce costs for the RAID storage used by a blade center.

SUMMARY OF THE INVENTION

The present invention has been developed in response to the present state of the art, and in particular, in response to the problems and needs in the art that have not yet been fully solved by currently available RAID storage integration methods. Accordingly, the present invention has been developed to provide an apparatus, system, and method for integrating raid storage in a blade center that overcome many or all of the above-discussed shortcomings in the art.

The apparatus to integrate RAID storage is provided with a plurality of modules configured to functionally execute the steps of mounting a plurality of mutually autonomous storage subsystems and accessing the storage subsystems from a server blade. These modules in the described embodiments include a switch module and a plurality of storage subsystems.

The switch module is embodied in a blade center. A server blade and/or storage subsystem mounted within a blade center enclosure may connect with and communicate through the switch module. The switch module is configured as a non-blocking, cross-point switch.

The storage subsystems are mutually autonomous. Thus each storage subsystem may be accessed independently of any other storage subsystem. Each storage subsystem communicates through the switch module. A server blade mounted in the blade center may communicate with a first storage subsystem through the switch module, storing data to and retrieving data from the storage subsystem.

Each storage subsystem includes a storage module and at least two redundant RAID controllers. The storage module may include a plurality of storage devices such as hard disk drives, micromechanical storage devices, optical storage devices, and the like. The storage module mounts within the blade center. The RAID controllers also mount within the blade center and control the storage module. The apparatus integrates the RAID storage within the blade center.

A system of the present invention is also presented to integrate RAID storage. The system may be embodied as a blade center. In particular, the system, in one embodiment, includes a blade center and a plurality of storage subsystems. The blade center includes a switch module and a server blade. The switch module is configured as a non-blocking, cross-point switch. The server blade is mounted within the blade center and is in communication with the switch module.

The storage subsystems are mutually autonomous and communicate with the server blade through the switch module. The switch module may zone a first storage subsystem as an independent storage domain. In one embodiment, the switch module may restrict the server blade's access to a first storage subsystem. Each storage subsystem includes a storage module and a RAID controller. In one embodiment, each storage subsystem includes at least two redundant RAID controllers.

In one embodiment, the RAID controllers communicate with the storage module through the switch module. In an alternate embodiment, the RAID controllers communicate with the storage module through a dedicated communications channel. The system integrates RAID storage to reduce the costs of managing the system.

A method of the present invention is also presented for integrating RAID storage. The method in the disclosed embodiments substantially includes the steps to carry out the functions presented above with respect to the operation of the described apparatus and system. In one embodiment, the method includes mounting a plurality of mutually autonomous storage subsystems and accessing the storage subsystems from a server blade.

A plurality of mutually autonomous storage subsystems mount within a blade center. Each storage subsystem includes a storage module comprising a plurality of storage devices and a RAID controller. In one embodiment, the RAID controller establishes communications with the storage module through a switch module. A server blade mounted within the blade center may access a first storage subsystem through the switch module. In one embodiment, the switch module zones a second storage subsystem as an independent storage domain. The switch module is a non-blocking, cross-point switch. In one embodiment, the switch module restricts the server blade's access to the second storage subsystem. The method supports a plurality of autonomous storage systems mounted within the blade center.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention integrates RAID storage within a blade center. In addition, the embodiment of the present invention may restrict a server blade's access to a storage subsystem. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
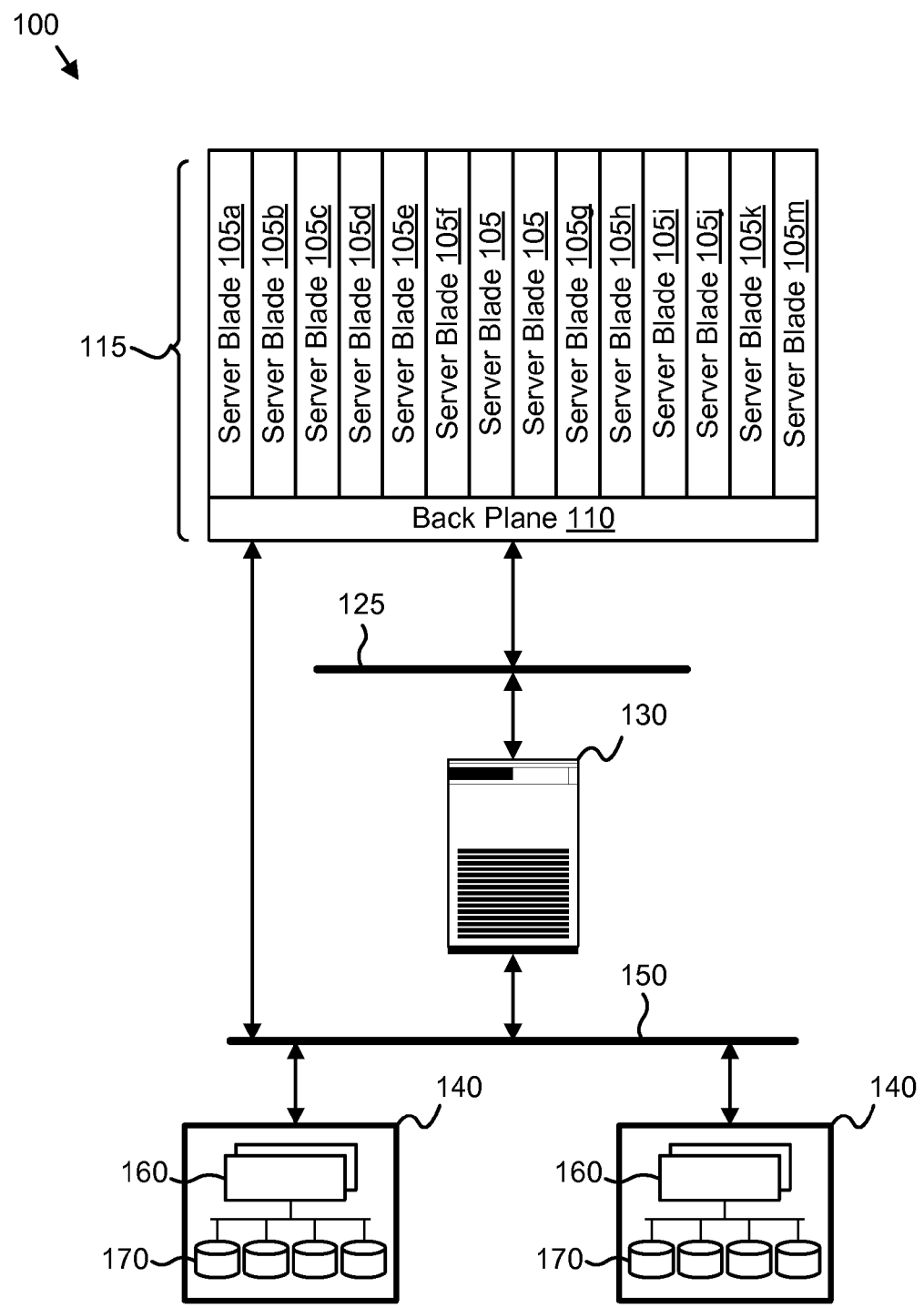
FIG. 1 is a schematic block diagram illustrating one embodiment of a blade center/storage system.

FIG. 1 is a schematic block diagram illustrating one embodiment of a blade center/storage 100 system. The system 100 includes a blade center 115, a local area network ("LAN") 125, a storage server 130, a storage network 150, and one or more storage subsystems 140. The blade center 115 includes one or more server blades 105 and a back plane 110. In one embodiment, the blade center 115 is configured as an enclosure with a back plane 110 for receiving server blades 105. The storage subsystems 140 each include one or more storage controllers 160 and one or more storage devices 170.

Each server blade 105 may include one or more processors, one or more memory modules, and interface logic as is well known to those skilled in the art. The interface logic may communicate with the back plane 110. Each server blade 105 may execute one or more software processes. In one example, a first server blade 105a may execute an accounting program while a second, third, and fourth server blade 105b, 105c, 105d execute a transactional database program.

An administrator may easily replace a failed server blade 105. For example, if the first server blade 105a fails, the administrator may transfer tasks of the first server blade to another server blade 105 such as a second server blade 105b, remove the first server blade 105a from the back plane 110, and mount a replacement server blade 105 on the back plane 110 in the place or slot of the first server blade 105a. A slot may include one or more connectors for connecting a device such as a server blade 105 to the back plane 110. In one embodiment, a plurality of slots may mount one device. The slot may also include mounting hardware for retaining a mounted device as is well known to those skilled in the art.

The administrator may easily add server blades 105 to vacant slots within blade center 115 to increase the processing capacity of the blade center 115. In one embodiment, server blades 105 may be hot-swapped or dismounted and mounted from the back plane 110 while the blade center 115 is operational.

The server blades 105 may also by configured with local storage devices such as hard disk drives. In addition, the server blades 105 will typically store significant data on the storage devices 170 of the storage subsystems 140. The server blades 105 may store data to and retrieve data from the storage devices 170 by communicating through the storage server 130 with the storage controllers 160. The LAN 125 may carry communications between the blade center 115 and the storage server 130 while the storage network 150 may carry communications between the blade center 115 and storage controllers 160. In one embodiment, the storage server 130, storage network 150, and storage subsystems 140 are configured as a SAN.

The storage controllers 160 may be configured as RAID storage controllers 160. The storage controllers 160 may manage the redundant storage of data across one or more storage devices 170, such that if a storage device 170 fails, the stored data may be received from the remaining storage devices 170 as is well known to those skilled in the art. The storage devices 170 may be configured as hard disk drives, micromechanical storage devices, semiconductor storage devices, optical storage devices, or the like.

Unfortunately, the storage subsystems 140 are not as easily managed as the server blades 105. The storage subsystems 140 must be connected with data cables directly to the server blades 105 and/or through the LAN 125, the storage server 130, and the storage network 150 to the server blades 105. In addition, storage devices 170 and storage controllers 160 of the storage subsystems 140 may require further interconnections with data cables.

The embodiment of the present invention supports integrating RAID storage within the blade center 115. The integrated RAID storage may be maintained by mounting and dismounting the RAID storage within the blade center 115, supporting less costly maintenance and administration of data storage for the blade center 115.

Figure 2:
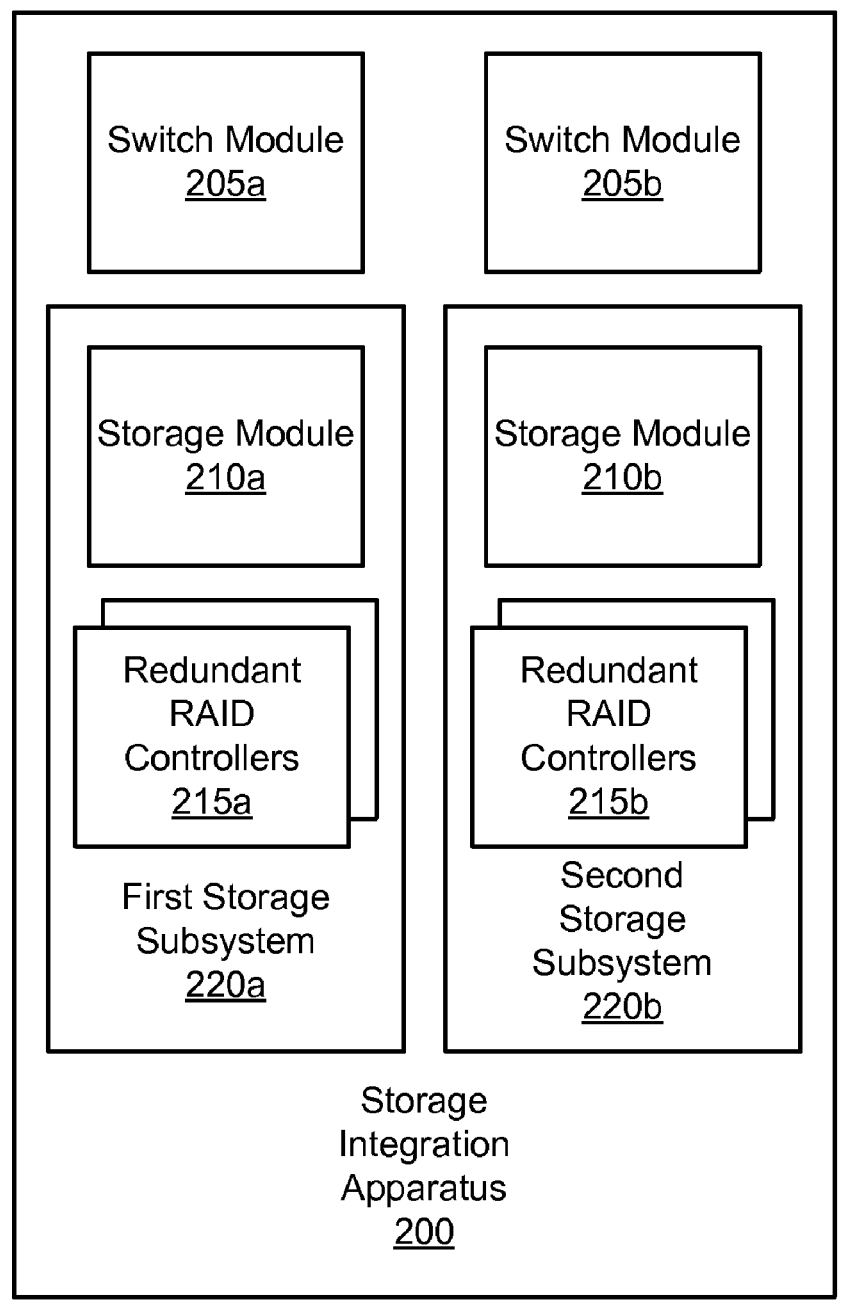
FIG. 2 is a schematic block diagram illustrating one embodiment of a storage integration apparatus of the present invention.

FIG. 2 is a schematic block diagram illustrating one embodiment of a storage integration apparatus 200 of the present invention. The apparatus 200 includes one or more switch modules 205 and a plurality of storage subsystems 220. In addition, each storage subsystem 220 includes a storage module 210 and at least two redundant RAID controllers 215. The description of the apparatus 200 refers to elements of FIG. 1, like numbers referring to like elements.

The switch modules 205 are embodied in a blade center 115 such as the blade center 115 of FIG. 1. In addition, the switch modules 205 are configured to communicate with a plurality of elements such as server blades 105 and the storage subsystems 220. The server blades 105 communicate with a switch module 205 when mounted in the blade center 115. In one embodiment, each switch module 205 comprises a back plane 110 such as the back plane 110 of FIG. 1.

Each switch module 205 is a non-blocking, cross-point switch. Thus any element communicating with the switch module 205 may communicate with any other element communicating with the switch module 205. For example, communications of the first and second server blades 105a, 105b through a first switch module 205a never block communications between the third and fourth server blades 105c, 105d.

In one embodiment, each switch module 205 includes a one or more cross-point connection grids as are well known to those skilled in the art. Each element communicating with the switch module 205 such as a server blade 105, a RAID controller 215, and/or a storage module 210 may have one or more ports that communicate with a channel of a cross-point connection grid. The ports may be configured as bi-directional ports. Alternatively, some ports may be configured as input ports and some ports may be configured as output ports.

The cross-point connection grid may comprise a plurality of channels. A server blade 105 may configure interconnections between ports and channels to route a signal carrying digital electronic communications between any two ports of any two elements in communication with the switch module 205.

In one embodiment, an administrator directs the server blade 105 to configure the interconnections. Alternatively, configuration software executing on the server blade 105 may automatically configure the interconnections to route communications through the switch module 205 between two or more elements.

In a certain embodiment, each channel of a first cross-point connection grid may communicate with a channel of a second cross-point connection grid. Each element may further communicate through ports with each cross-point connection grid. Thus communications between elements may be routed through a plurality of interconnections of a plurality of cross-point connection grids.

In one embodiment, each element comprises a plurality of input ports and a plurality of output ports. The first cross-point connection grid may be configured to receive inputs from element output ports and the second cross-point connection grid may be configured to communicate outputs to element input ports. Alternatively, the first and second cross-point connection grids may each communicate with both input ports and output ports.

In an alternate embodiment, each element communicates with each switch module 205 through a plurality of ports. The number of ports for each element may be at most equivalent to the number of elements minus one that communicate with a switch module. Thus if fourteen (14) elements communicate with a switch module 205, each element may have fourteen minus one or thirteen (13) ports that communicate with the switch module 205.

The storage subsystems 220 mount within the blade center 115. In one embodiment, a storage subsystem 220 comprises one or more integrated storage modules 210 and one or more integrated redundant RAID controllers 215 wherein the storage subsystem 220 with integrated storage module 210 and redundant RAID controllers 215 mounts as a unit within the blade center 115. Alternatively, the storage subsystem 220 comprises one or more discrete storage modules 210 and one or more discrete redundant RAID controllers 215 wherein each storage module 210 and the redundant RAID controllers 215 mount within the blade center 115. In a certain embodiment, the redundant RAID controllers 215 may be configured as a single RAID controller.

The storage subsystems 220 are mutually autonomous. Thus a first storage subsystem 220a may function independently of a second storage subsystem 220b. In one example, the first storage subsystem 220a may be removed from the blade center 115 without impacting the operation of the second storage subsystem 220b. Each storage subsystem 220 communicates through a switch module 205 with one or more server blades 105 and one or more storage subsystems 220. For example, a server blade 105 mounted in the blade center 115 may communicate with the first storage subsystem 220a through the first switch module 205a, storing data to and retrieving data from the storage subsystem 220.

The storage module 210 may include one or more storage devices 170 such as hard disk drives, micromechanical storage devices, optical storage devices, and the like. The storage devices 170 may be configured as a RAID system with data stored redundantly across the storage devices 170 as is well known to those skilled in the art. The redundant RAID controllers 215 control the storage module 210. In one embodiment, the redundant RAID controllers 215 control each storage device 170 of the storage module 210. The apparatus 200 integrates the RAID storage of the storage module 210 within the blade center 115 for the plurality of storage subsystems 220.

Figure 3:
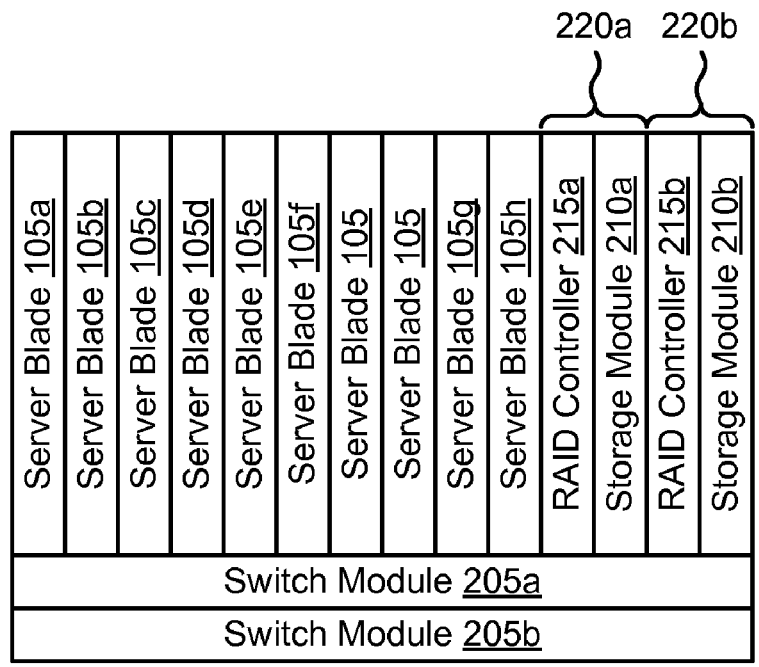
FIG. 3 is a schematic block diagram illustrating one embodiment of a blade center of the present invention.

FIG. 3 is a schematic block diagram illustrating one embodiment of a blade center 300 of the present invention. The blade center 300 may embody the apparatus 200 of FIG. 2. In addition, the description of the blade center 300 refers to elements of FIGS. 1-2, like numbers referring to like elements. The blade center 300 includes one or more server blades 105, one or more switch modules 205, one or more storage modules 210, and one or more redundant RAID controllers 215. Although for simplicity the blade center 300 is depicted with two switch modules 205, fourteen (14) slots mounting ten (10) server blades 105, two (2) storage modules 210, and two (2) redundant RAID controllers 215, the blade center 300 may have any number of switch modules 205 and slots and mount any number of server blades 105, storage modules 210, and redundant RAID controllers 215.

Each server blade 105 is depicted as a discrete device that mounts within the blade center 300. Each storage module 210 and redundant RAID controllers 215 is also depicted as a discrete device that mounts within the blade center 300. The first storage module 210a and first redundant RAID controller 215a embody the first storage subsystem 220a while the second storage module 210b and the second redundant RAID controller 215b embody the second storage subsystem 220b.

The server blades 105 communicate with the switch modules 205. The storage modules 210 and redundant RAID controllers 215 also communicate with the switch modules 205. The server blades 105 may store data to and retrieve data from the first and/or second storage subsystem 220a, 220b. In one example, the first server blade 105a may store data to the first storage module 210a of the first storage subsystem 220a by communicating the data through the first switch module 205a to the first redundant RAID controller 215a. The first redundant RAID controller 215a may write the data as redundant data to two or more storage devices 170 of the first storage module 210a through the first switch module 205a.

For example, an administrator may replace the first storage module 210a by halting writes to the first storage module 210a. In addition, the administrator may migrate data from the first storage module 210a to the second storage module 210b by communicating the data through the first redundant RAID controller 215a and the first switch module 205a to the second redundant RAID controller 215b. The second redundant RAID controller 215b may write the migrated data as redundant data to the second storage module 210b. The administrator may further mount a replacement storage module 210 in place of the first storage module 210a and direct the second redundant RAID controller 215b to communicate the data from the second storage module 210b through a second switch module 205b to the first redundant RAID controller 215a. The first redundant RAID controller 215a may write the data to the replacement storage module 210 so that the replacement storage module 210 takes the place of the first storage module 210a.

Figure 4:
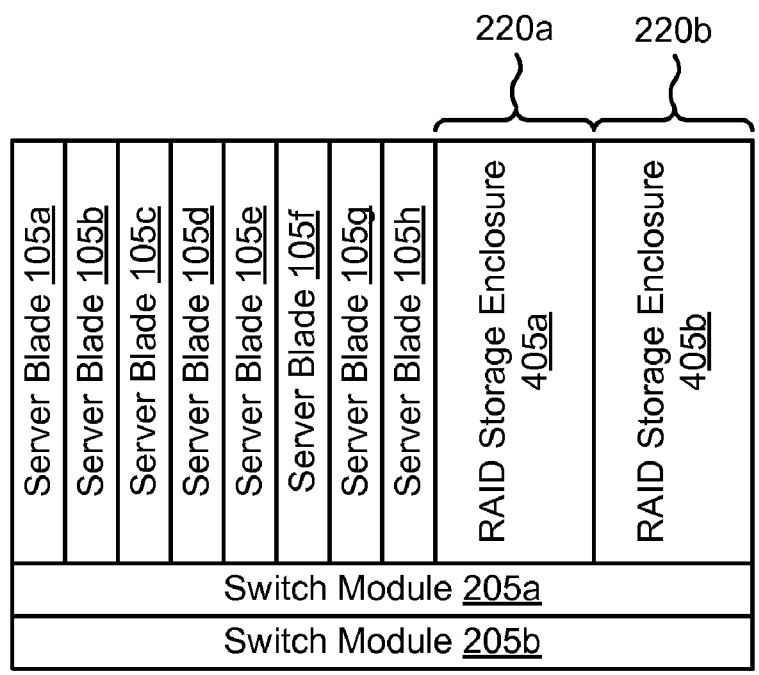
FIG. 4 is a schematic block diagram illustrating one embodiment of a multi-slot-blade blade center of the present invention.

FIG. 4 is a schematic block diagram illustrating one embodiment of a multi-slot-blade blade center 400 of the present invention. The blade center 400 may be the blade center 300 of FIG. 3. In addition, the blade center 400 is configured to receive devices that occupy a plurality of slots within the blade center 400. The description of the blade center 400 refers to elements of FIGS. 1-3, like numbers referring to like elements.

The blade center 400 includes one or more server blades 105 and one or more RAID storage enclosures 405. Although for simplicity the blade center 400 is depicted with fourteen (14) slots mounting eight (8) server blades 105 and two (2) RAID storage enclosures 405, the blade center 400 may have any number of slots mounting any number of server blades 105 and RAID storage enclosures 405.

Each RAID storage enclosure 405 may embody a storage subsystem 220. In addition, each RAID storage enclosure 405 integrates a storage module 210 and redundant RAID controllers 215. The server blades 105 and RAID storage enclosures 405 mount within the blade center 400 and communicate through the switch modules 205. Thus the server blades 105 may store data to and retrieve data from the RAID storage enclosure 405 by communicating with the RAID storage enclosure 405 through a switch module 205.

In one example, the administrator may reduce the storage capacity of the blade center 400 by removing the second RAID storage enclosure 405b. The administrator may remove the second RAID storage enclosure 405b by halting writes to the second RAID storage enclosure 405b, migrating the data from the second RAID storage enclosure 405b to the first RAID storage enclosure 405a, and dismounting the second RAID storage enclosure 405b.

Figure 5:
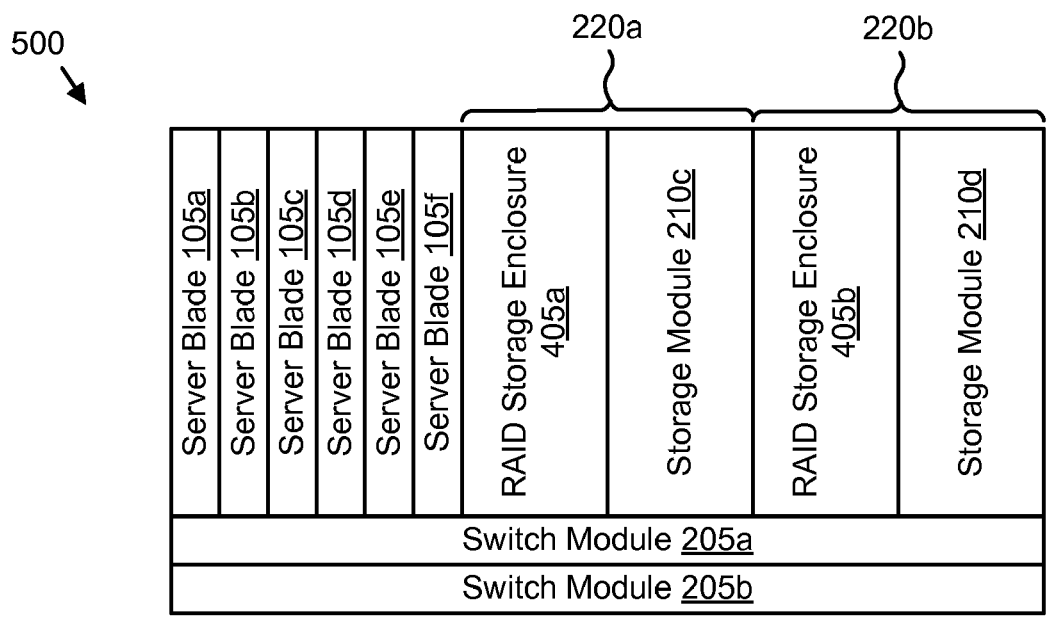
FIG. 5 is a schematic block diagram illustrating one alternate embodiment of a multi-slot-blade blade center of the present invention.

FIG. 5 is a schematic block diagram illustrating one alternate embodiment of a multi-slot-blade blade center 500 of the present invention. The blade center 500 may be the blade center 400 of FIG. 4. The description of the blade center 500 refers to elements of FIGS. 1-4, like numbers referring to like elements.

The blade center 500 includes one or more server blades 105 and one or more RAID storage enclosures 405 as depicted in FIG. 4. In addition, the blade center 500 includes one or more storage modules 210.

In one embodiment, a RAID storage enclosure 405 and one or more storage modules 210 comprise a storage subsystem 220. Although for simplicity each storage subsystem 220 is depicted with one RAID storage enclosure 405 and one storage module 210, each storage subsystem 220 may include any number of RAID storage enclosures 405, redundant RAID controllers 215, and storage modules 210.

A server blade 105 may store data to a first storage subsystem 220a by communicating the data to a first RAID storage enclosure 405a. The first RAID storage enclosure 405a may write the data to a storage module 210 integrated within the first RAID storage enclosures 405a. Alternatively, the first RAID storage enclosure 405a may write the data to a third discrete storage module 210c as will be described hereafter for FIGS. 7 and 8.

Figure 6:
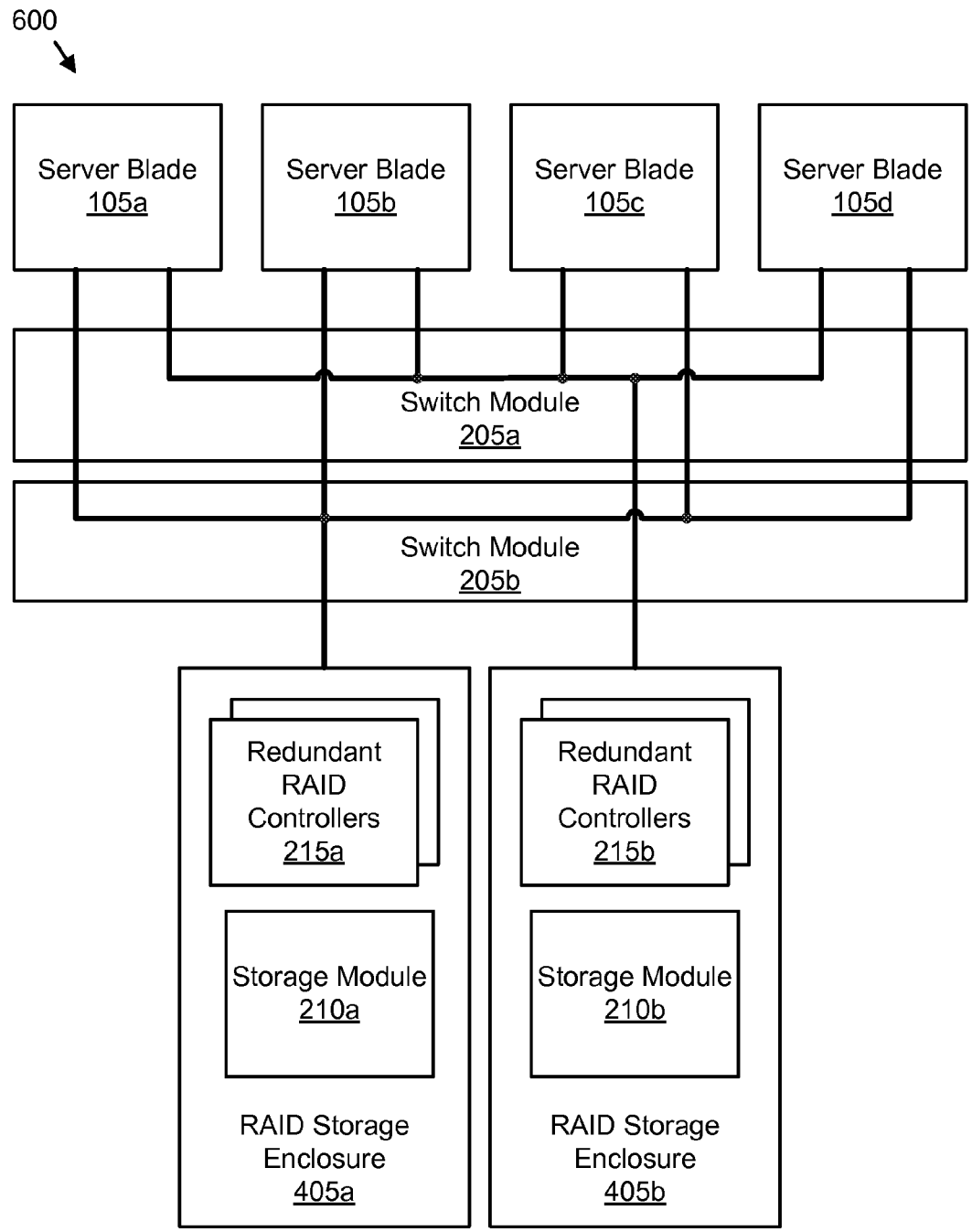
FIG. 6 is a schematic block diagram illustrating one embodiment of a blade center system with integrated RAID controllers/storage modules of the present invention.

FIG. 6 is a schematic block diagram illustrating one embodiment of a blade center system 600 with integrated redundant RAID controllers 215/storage modules 210 of the present invention. The system 600 is one example of the blade center 400 of FIG. 4, showing the interconnection of server blades 105 and RAID storage enclosures 405 through the switch modules 205. In addition, the description of the system 600 refers to elements of FIGS. 1-5, like numbers referring to like elements.

Each RAID storage enclosure 405 is shown with an integrated storage module 210 and redundant RAID controllers 215. In one embodiment, each RAID storage enclosure 405 comprises a storage subsystem 220. The server blades 105 and RAID storage enclosures 405 are mounted within the blade center 400.

The server blades 105 and RAID storage enclosures 405 are in communication with the switch modules 205. In addition, the RAID storage enclosures 405 may communicate with one or more server blades 105 through a switch module 205.

In the depicted example, each server blade 105 communicates with the first RAID storage enclosure 405a through a common channel in the second switch module 205b. In addition, each server blade 105 communicates with the second RAID storage enclosure 405b through a common channel in the first switch module 205a.

In one embodiment, the switch modules 205 zone the first and second RAID storage enclosures 405a, 405b as independent storage domains. Thus, the storage subsystems 220 embodied by the RAID storage enclosures 405 are mutually autonomous. In a certain embodiment, the switch modules 205 restrict a server blade 105 from accessing a storage subsystem 220. In one example, the first switch module 205a may not provide access for the first, third, and fourth server blades 105a, 105c, 105d to the second RAID storage enclosure 405b that embodies the second storage subsystem 220b.

Figure 7:
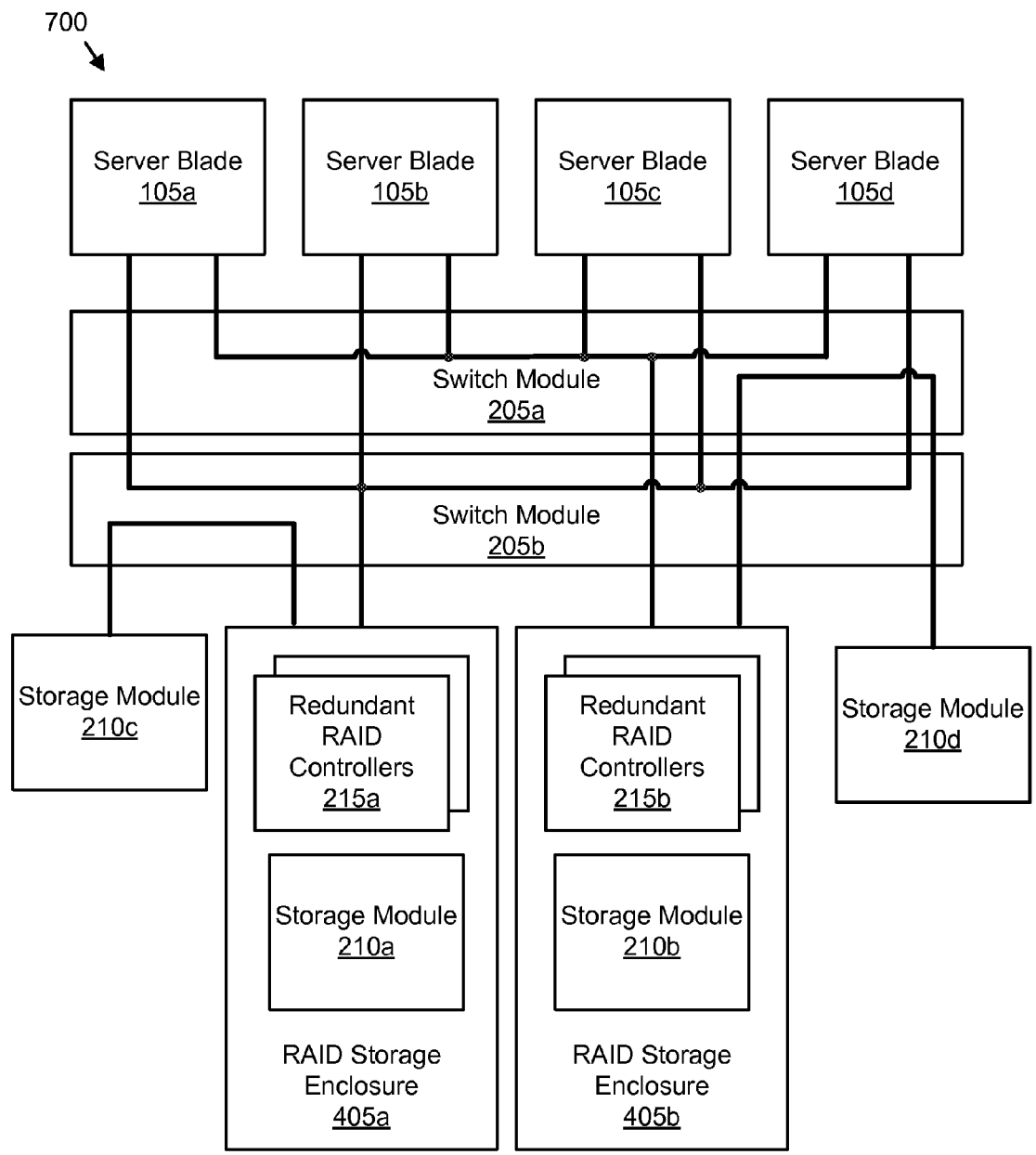
FIG. 7 is a schematic block diagram illustrating one embodiment of a blade center system with through switch module RAID controller/storage module communication of the present invention.

FIG. 7 is a schematic block diagram illustrating one embodiment of a blade center system 700 with through switch module 205/RAID controller 215/storage modules 210 communication of the present invention. The system 700 is one example of the blade center 500 FIG. 5, showing the interconnection of server blades 105, RAID storage enclosures 405, and discrete storage modules 210c, 210d through the switch modules 205. In addition, the description of the system 700 refers to elements of FIGS. 1-6, like numbers referring to like elements.

The storage servers 105 and RAID storage enclosures 405 are depicted connected through the switch modules 205 as in FIG. 6. The redundant RAID controllers 215 of each RAID storage enclosure 405 control the integrated storage module 210 of the RAID storage enclosure 405. In one example, the first redundant RAID controller 215a controls the first storage module 210a, wherein the first redundant RAID controller 215a and the first storage module 210a are integrated in the first RAID storage enclosure 405a. In addition, a third storage module 210c is shown in communication with the first RAID storage enclosure 405a through the second switch module 205b and a fourth storage module 210d is shown in communication with the second RAID storage enclosure 405b through the first switch module 205a. The server blades 105, RAID storage enclosures 405, and storage modules 210 are mounted within the blade center 500.

The embodiment of the present invention supports controlling one or more added discrete storage modules 210c, 210d with the integrated redundant RAID controllers 215 of the RAID storage enclosure 405 and/or discrete redundant RAID controllers 215. Although for simplicity a single discrete storage module 210c, 210d is added to the control of each RAID storage enclosure 405, any number of storage modules 210 may be added to the control of a RAID storage enclosure 405 and/or redundant RAID controllers 215.

In the depicted example, the first and second RAID storage enclosures 405a, 405b each communicate through the switch modules 205 with the third and fourth discrete storage module 210c, 210d respectively. The first RAID storage enclosure 405a may control the third storage module 210c, storing data to and retrieving data from the third storage module 210c through the second switch module 205b.

Figure 8:
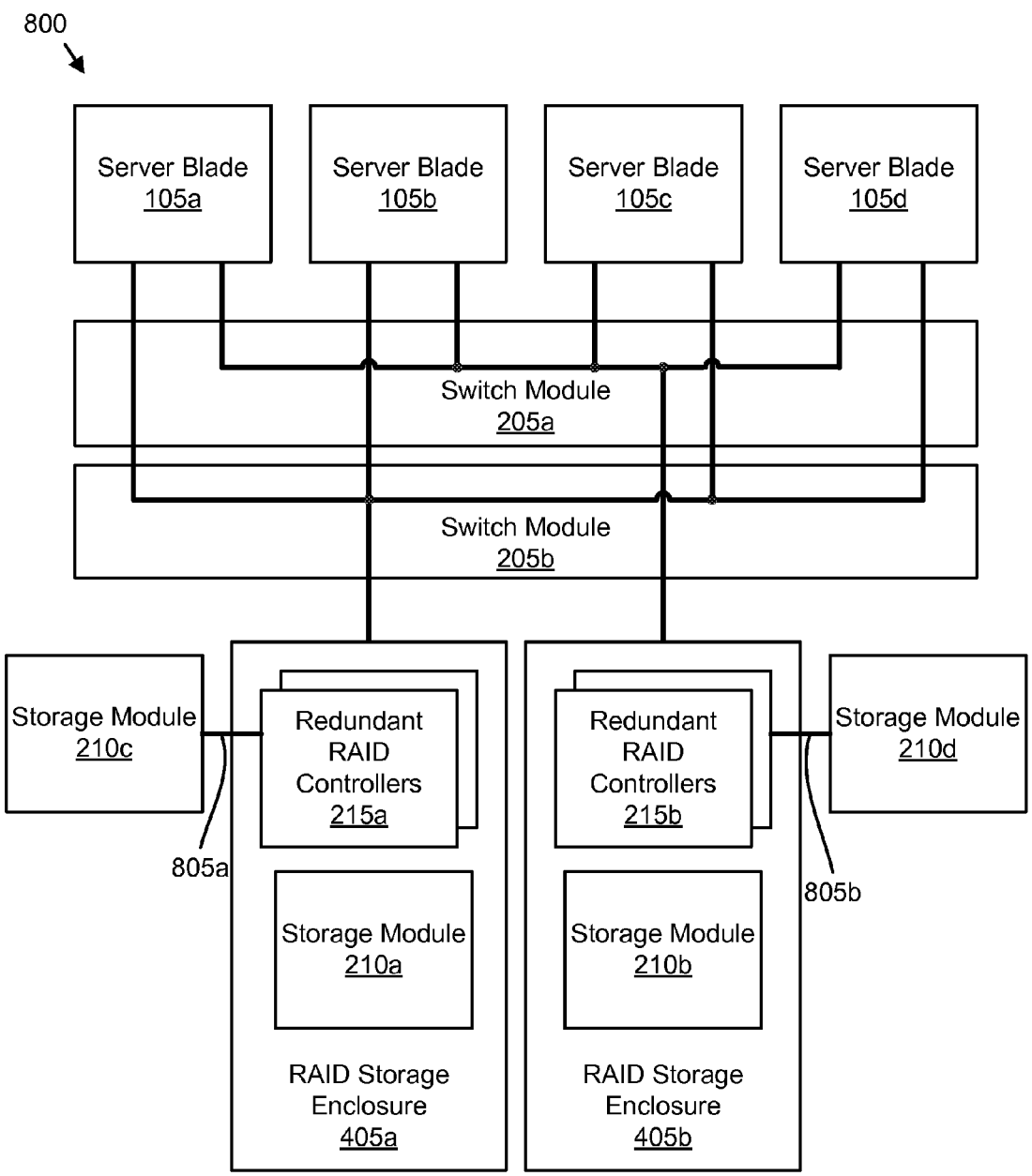
FIG. 8 is a schematic block diagram illustrating one embodiment of a blade center system with dedicated RAID controller/storage module communication of the present invention.

FIG. 8 is a schematic block diagram illustrating one embodiment of a blade center system 800 with dedicated redundant RAID controllers 215/storage module 210 communication of the present invention. The system 800 is an alternate example of the blade center 500 FIG. 5, showing the interconnection of the RAID storage enclosures 405 and the discrete storage modules 210c, 210d through dedicated communication channels 805. In addition, the description of the system 800 refers to elements of FIGS. 1-7, like numbers referring to like elements.

The server blades 105, RAID storage enclosures 405, and storage modules 210 are mounted within the blade center 500. The storage servers 105 and RAID storage enclosures 405 are depicted connected through the switch modules 205 as in FIGS. 6 and 7. In addition, the third and fourth discrete storage modules 210c, 210d are shown in communication with the first and second RAID storage enclosure 405a, 405b respectively through one or more dedicated communication channels 805. The dedicated communication channels 805 may be Fibre channel communication channels, small computer system interface ("SCSI") communication channels, or the like. In a certain embodiment, cables connect the RAID storage enclosures 405 and the storage modules 210.

In one embodiment, the storage modules 210c, 210d are mounted next to the RAID storage enclosure 405 and/or redundant RAID controllers 215 within the blade center 500. In one example, the third storage module 210c is mounted next to the first RAID storage enclosure 405a and the fourth storage module 210d is mounted next to the second RAID storage enclosure 405b.

In an alternate embodiment, the discrete storage modules 210c, 210d maybe mounted in a slot that is removed from the RAID storage enclosure 405 and/or redundant RAID controllers 215. In an alternate example, the third storage module 210c may be separated from the first RAID storage enclosure 405a by two slots. In addition, the third storage module 210c may be connected to the first RAID storage enclosure 405a by a serial attached SCSI (SAS) connection, a Fibre channel connection, or the like.

Figure 9:
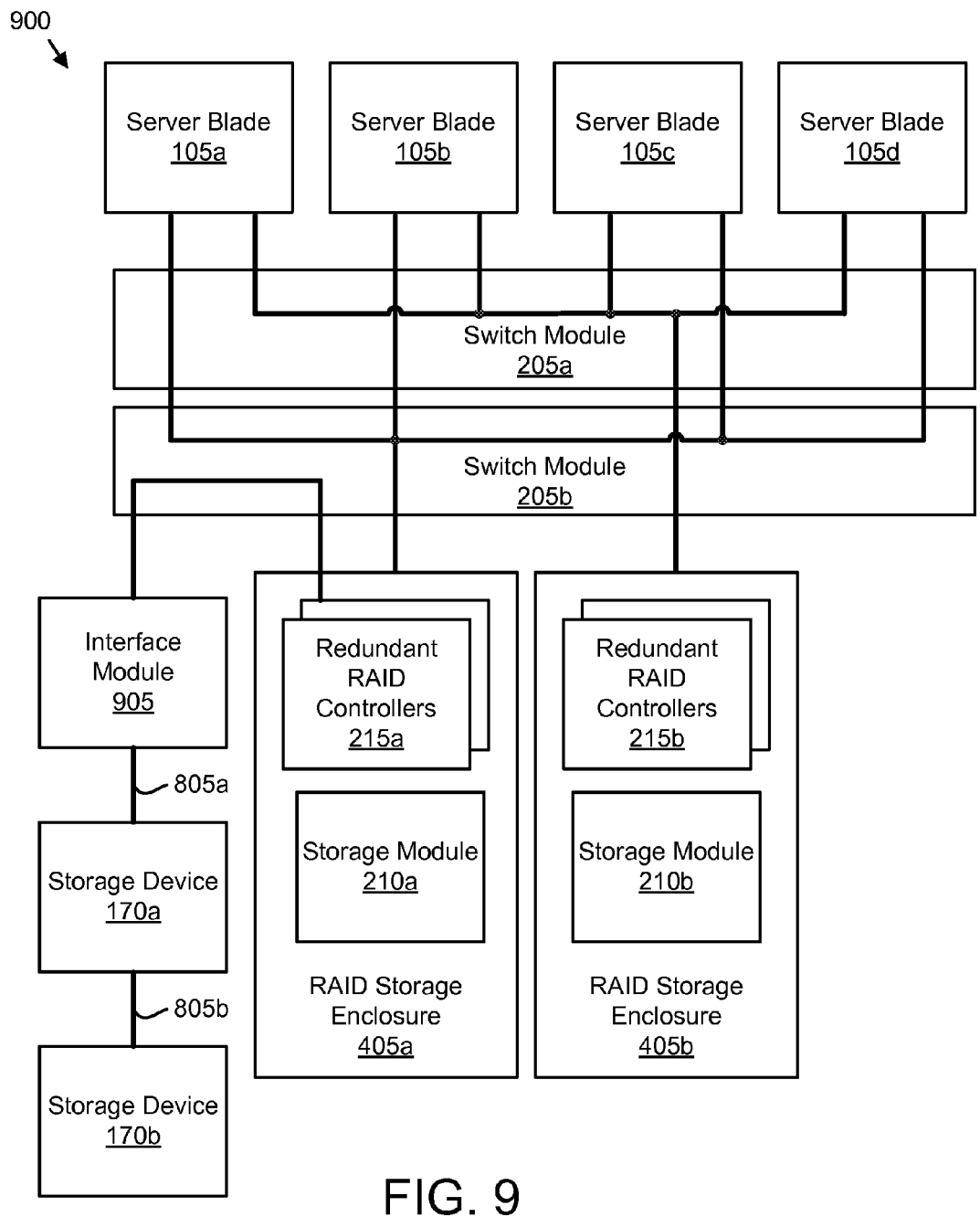
FIG. 9 is a schematic block diagram illustrating one embodiment of a blade center system with external storage device of the present invention.

FIG. 9 is a schematic block diagram illustrating one embodiment of a blade center system 900 with external storage device of the present invention. The server blades 105, switch modules 205, and RAID storage enclosures 405 of FIGS. 6-8 are shown. In addition, the description of the system 900 refers to elements of FIGS. 1-8, like numbers referring to like elements. The first RAID storage enclosure 405a is shown in communication with an interface module 905 through the second switch module 205b.

The interface module 905 may mount in a slot within the blade center 115. Alternative, the interface module 905 may be integrated within blade center 115. The interface module 905 may be a Fibre channel interface, a SCSI interface, or the like. The interface module 905 may communicate with one or more storage devices 170 over a dedicated communication channel 805. The first redundant RAID controller 215a of the first RAID storage enclosure 405a control the storage devices 170 through the interface module 905. The first redundant RAID controller 215a may control the storage devices 170, expanding the storage capacity of the storage subsystem 220 embodied by the first RAID storage enclosure 405a.

Figure 10:
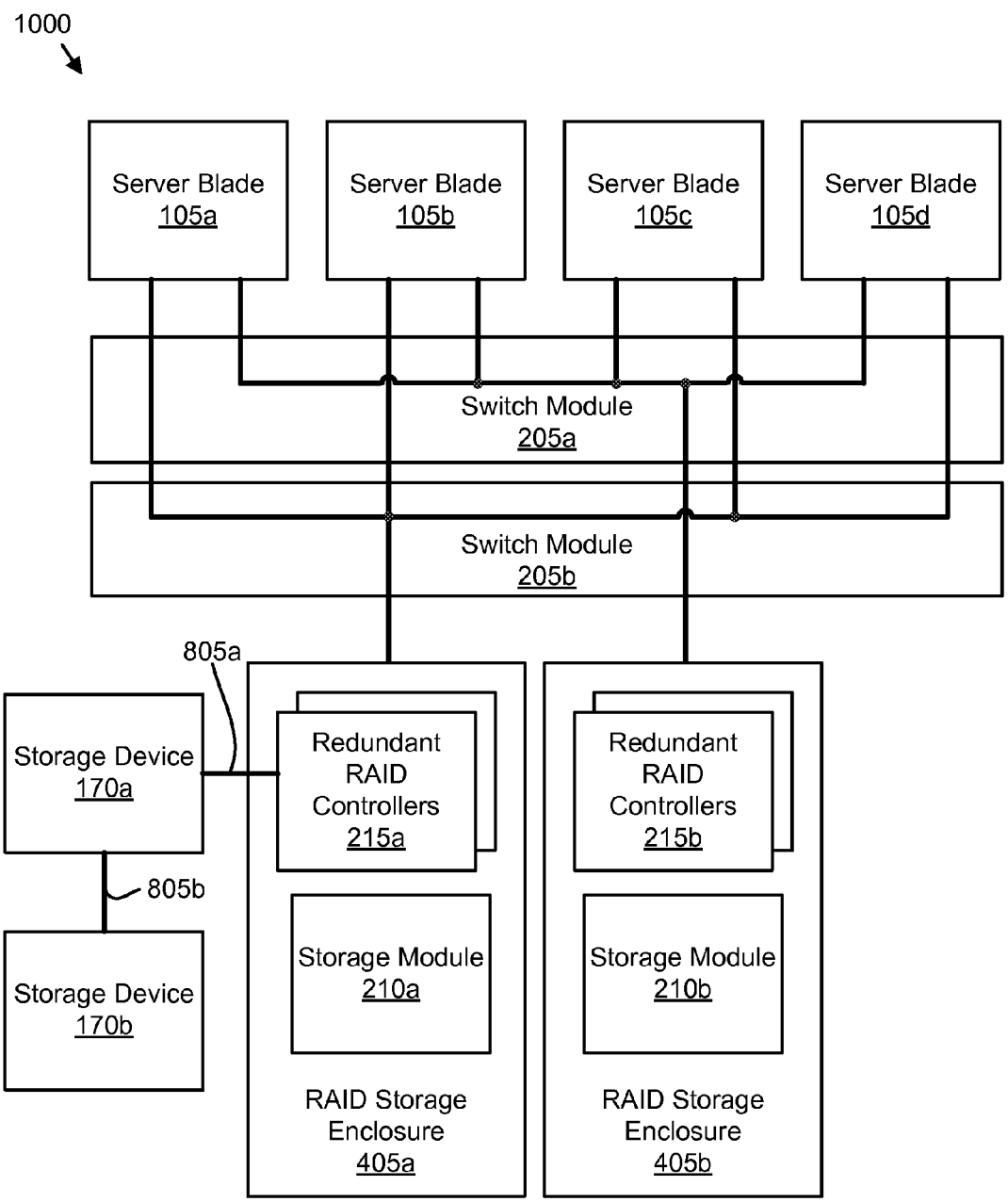
FIG. 10 is a schematic block diagram illustrating one alternate embodiment of a blade center system with external storage device of the present invention.

FIG. 10 is a schematic block diagram illustrating one alternate embodiment of a blade center system 1000 with external storage device of the present invention. The server blades 105, switch modules 205, and RAID storage enclosures 405 of FIGS. 6-9 are shown. In addition, the description of the system 1000 refers to elements of FIGS. 1-9, like numbers referring to like elements.

The first redundant RAID controller 215a of the first RAID storage enclosure 405a are in communication with a first and second storage device 170a, 170b through dedicated communication channels 805. The storage devices 170 are external to the blade center 115. In one embodiment, the first redundant RAID controller 215a communicates with the storage devices 170 over a Fibre channel connection. Alternatively, the first redundant RAID controller 215a may communicate with the storage devices 170 over a SAS connection.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 11:
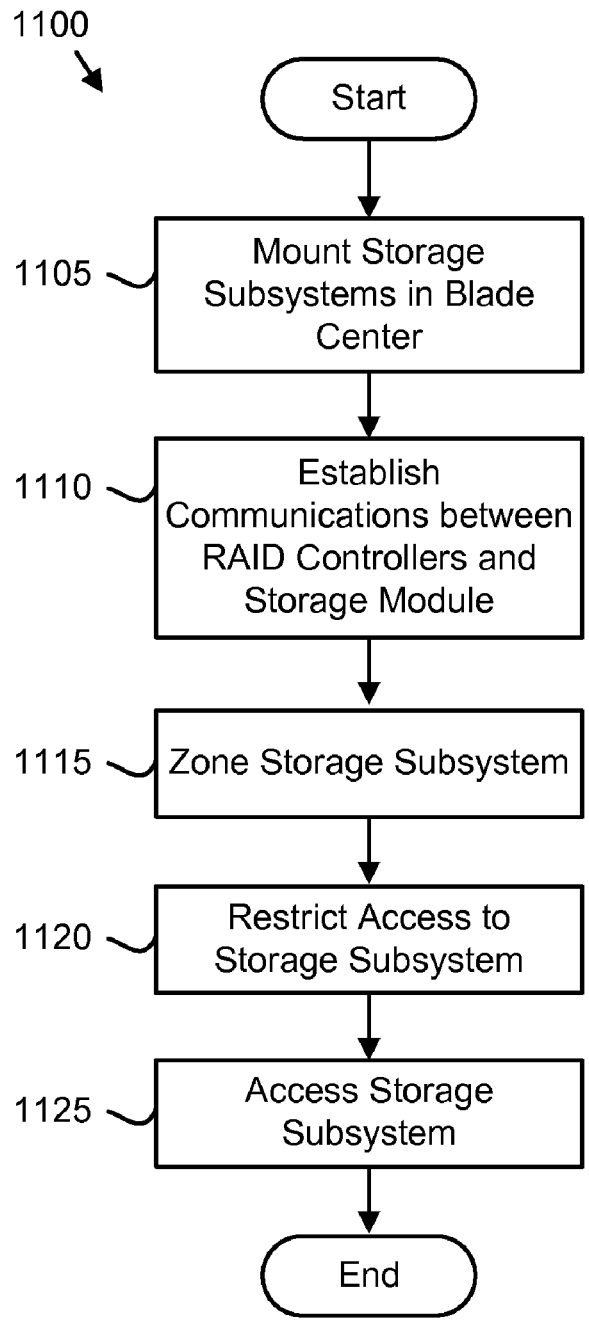
FIG. 11 is a schematic flow chart diagram illustrating one embodiment of a RAID storage integration method in accordance with the present invention.

FIG. 11 is a schematic flow chart diagram illustrating one embodiment of a RAID storage integration method 1100 in accordance with the present invention. The method 1100 substantially includes the steps to carry out the functions presented above with respect to the operation of the described apparatus 200, 300, 400, 500 and systems 600, 700, 800, 900, 1000 of FIGS. 1-10. The description of the method 1100 also refers to elements of FIGS. 1-10, like numbers referring to like elements.

The method 1100 begins and a plurality of mutually autonomous storage subsystems 220 mount 1105 within a blade center 115. Each storage subsystem 220 includes a storage module 210 comprising a plurality of storage devices 170 and at least one redundant RAID controller 215. In one embodiment, the redundant RAID controllers 215 and the storage controller 210 may be integrated in a RAID storage enclosure 405 that mounts in one or more slots of the blade center 115. Alternatively, each redundant RAID controller 215 and storage module 210 may be discrete devices mounting in one or more slots of the blade center 115. Each mounted device communicates with a switch module 205 of the blade center 115.

In one embodiment, the redundant RAID controllers 215 of each storage subsystem 220 establish 1110 communications with the corresponding storage module 210. The redundant RAID controllers 215 may communicate with the storage module 210 through a communication channel such as a dedicated data bus, Fibre channel connection, SCSI connection, or the like within the RAID storage enclosure 405 if the redundant RAID controllers 215 and storage module 210 are integrated in the RAID storage enclosure 405. Alternatively, the redundant RAID controllers 215 may communicate with the storage module 210 through a switch module 205 if the redundant RAID controllers 215 and storage module 210 are discrete devices. In a certain embodiment, the redundant RAID controllers 215 communicate with the storage module 210 through a dedicated communication channel 805.

In one embodiment, the switch module 205 zones 1115 a storage subsystem 220 as an independent storage domain. As the independent storage domain, the storage subsystem 220 may be managed as a single logical entity. In addition, a server blade 105 may employ an independent logical address in communicating with the storage subsystem 220.

In one embodiment, the switch module 205 restricts 1120 a blade server 105 from accessing a storage subsystem 220. For example, the switch module may restrict 1120 the second server blade 105b from access the first storage subsystem 220a. In one embodiment, the administrator directs a server such as a blade server 105 to configure the switch module 205 to restrict 1120 the second server blade 105b from accessing the first storage subsystem 220a.

The server blades 105 mounted within the blade center 115 may access 1125 a storage subsystem 220 such as the first storage subsystem 220a through the switch module 205. Thus modular storage subsystems 220 mounted within the blade center 115 store data for the modular server blades 105 that are also mounted within the blade center 115. The method 1100 supports a plurality of autonomous storage systems 220 mounted within the blade center 115.

The embodiment of the present invention integrates RAID storage within a blade center 115. In addition, the embodiment of the present invention may restrict a server blade 105 from accessing to a storage subsystem 220.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to integrate RAID storage, the apparatus comprising:
   a switch module of a blade center configured as a non-blocking, cross-point switch comprising a cross-point connection grid linking bi-directional ports;
   a plurality of mutually autonomous storage subsystems in communication through the switch module with a server blade mounted in the blade center wherein each storage subsystem comprises
      a storage module configured to mount within the blade center and store and retrieve data through a Fibre channel communications channel, the Fibre channel communications channel isolated from the switch module;
      a redundant array of independent disks ("RAID") controller configured to mount within the blade center adjacent to the storage module and control the storage module through the Fibre channel communications channel; and
   the switch module further zoning a first storage subsystem as an independent storage domain and restricting the server blade's access to the first storage subsystem.

2. The apparatus of claim 1, wherein the RAID controller is further configured to communicate with an external storage device.

3. The apparatus of claim 2, wherein the RAID controller communicates with the external storage device through a dedicated communications channel.

4. The apparatus of claim 1, wherein the RAID controller comprises first and second redundant controllers.

5. The apparatus of claim 4, wherein the independent storage domain is managed as a single logical entity.

6. The apparatus of claim 5, wherein the blade server employs an independent logical address to communicate with each storage subsystem.

7. A computer program product comprising a computer useable medium tangibly storing a computer readable program, wherein the computer readable program when executed on a computer causes the computer to:
   mount a plurality of mutually autonomous storage subsystems within a blade center wherein each storage subsystem comprises a storage module configured to store and retrieve data through a Fibre channel communications channel and a RAID controller configured to control the storage module, wherein the RAID controller is mounted adjacent to the storage module and controls the storage module through the Fibre channel communications channel;
   access the storage subsystems from a server blade mounted within the blade center through a switch module of the blade center wherein the switch module is configured as a non-blocking, cross-point switch comprising a cross-point connection grid linking bi-directional ports, wherein the Fibre channel communications channel is isolated from the switch module;
   zoning a first storage subsystem as an independent storage domain; and
   restricting the server blade's access to the first storage subsystem.

8. The computer program product of claim 7, wherein the computer readable code is further configured to cause the computer to establish communications between the RAID controller and an external storage device.

9. The computer program product of claim 7, wherein the RAID controller comprises first and second redundant controllers.

10. The computer program product of claim 9, wherein the independent storage domain is managed as a single logical entity.

11. The computer program product of claim 10, wherein the blade server employs an independent logical address to communicate with each storage subsystem.

12. A system to integrate RAID storage, the system comprising:
    a blade center comprising:
       a switch module configured as a non-blocking, cross-point switch comprising a cross-point connection grid linking bi-directional ports;
       a server blade configured to mount within the blade center and in communication with the switch module;
    a plurality of mutually autonomous storage subsystems in communication through the switch module with the server blade, wherein the switch module is configured to zone a first storage subsystem as an independent storage domain and restrict the server blade's access to the first storage subsystem and wherein each storage subsystem comprises
       a storage module mounted within the blade center and configured with a plurality of storage devices that store and retrieve data through a Fibre channel communications channel, the Fibre channel communications channel isolated from the switch module;
       a RAID controller mounted within the blade center adjacent to the storage module and configured to control the storage devices through the Fibre channel communications channel; and.

13. The system of claim 1, wherein the switch module is configured to zone a second storage subsystem as an independent storage domain.

14. The system of claim 12, wherein the RAID controller is further configured to communicate with an external storage device.

15. The system of claim 12, wherein the RAID controller comprises first and second redundant controllers.

16. The system of claim 15, wherein the independent storage domain is managed as a single logical entity.

17. The system of claim 16, wherein the blade server employs an independent logical address to communicate with each storage subsystem.

18. A method for deploying computer infrastructure, comprising storing computer-readable code on a storage device and integrating computer-readable code into a computing system, wherein the code executed on the computing system performs the following:
    mounting a plurality of mutually autonomous storage subsystems within a blade center wherein each storage subsystem comprises a storage module with a plurality of storage devices that store and retrieve data through a Fibre channel communications channel and a RAID controller configured to control the storage devices, wherein the RAID controller is mounted adjacent to the storage module and controls the storage module through the Fibre channel communications module;
    accessing the storage subsystems from a server blade mounted within the blade center through a switch module of the blade center wherein the switch module is configured as a non-blocking, cross-point switch comprising a cross-point connection grid linking bi-directional ports, wherein the Fibre channel communications channel is isolated from the switch module;

zoning a first storage subsystem as an independent storage domain; and restricting the server blade's access to the first storage subsystem.

19. The method of claim 18, wherein the RAID controller communicates with an external storage device.

20. The method of claim 18, wherein the RAID controller comprises first and second redundant controllers.

21. The method of claim 20, wherein the independent storage domain is managed as a single logical entity.

22. The method of claim 21, wherein the blade server employs an independent logical address to communicate with each storage subsystem.

* * * * *